United States Patent
Hansmaier et al.

(10) Patent No.: US 9,919,447 B2
(45) Date of Patent: Mar. 20, 2018

(54) METHOD FOR FRACTURE SPLITTING A CONNECTING ROD AND CORRESPONDING DEVICE

(71) Applicant: Neumayer Tekfor Engineering GmbH, Hausach (DE)

(72) Inventors: Helmut Hansmaier, Taufkirchen (DE); Volker Szentmihalyi, Gutach (DE)

(73) Assignee: Netumayer Tekfor Engineering GmbH, Hausach (DE)

( * ) Notice: Subject to any disclaimer, the term of this patent is extended or adjusted under 35 U.S.C. 154(b) by 0 days.

(21) Appl. No.: 14/274,272

(22) Filed: May 9, 2014

(65) Prior Publication Data
US 2014/0332577 A1    Nov. 13, 2014

(30) Foreign Application Priority Data
May 11, 2013    (DE) .................. 10 2013 008 115

(51) Int. Cl.
- *B26F 3/00* (2006.01)
- *F16C 7/02* (2006.01)
- *F16C 9/04* (2006.01)

(52) U.S. Cl.
CPC .............. *B26F 3/002* (2013.01); *F16C 7/023* (2013.01); *F16C 9/045* (2013.01);
(Continued)

(58) Field of Classification Search
CPC ..... B26F 3/002; B23D 31/003; B23D 31/002; B23P 2700/04
(Continued)

(56) References Cited

U.S. PATENT DOCUMENTS 4,754,906 A * 7/1988 Brovold ............... B23D 31/003
                                              225/103
4,768,694 A * 9/1988 Fabris et al. ................... 225/94
(Continued)

FOREIGN PATENT DOCUMENTS

CN        101452754 A   * 6/2009
DE        4406981 A1    * 9/1994 ................ B26F 3/00
(Continued)

OTHER PUBLICATIONS

Grady, D.E. and Benson, D.A., Fragmentation of Metal Rings by Electromagnetic Loading.[online],[retrieved on Jan. 22, 2016]. Retreived from the internet,<URL:http://link.springer.com/article/10.1007/BF02330054>.*
(Continued)

*Primary Examiner* — Jennifer Swinney
(74) *Attorney, Agent, or Firm* — Crowell & Moring LLP

(57) ABSTRACT

A method and a device for fracture splitting a connecting rod and a connecting rod formed therefrom are provided, in which a force exerted on an outer rim of an eye of the connecting rod by a separating tool is generated by an electromagnetic force. The separating tool includes at least two separating members inserted into the eye, and the electromagnetic force is generated by displacing the at least two separating members away from each other inside the eye in response to application of the electromagnetic force. The electromagnetic force may be generated by passing current through coils positioned between the at least two separating members in a manner that causes the coils to repel one another, preferably with a pulse duration of less than 100 microseconds, in order to minimize plastic deformation at the fracture locations.

7 Claims, 2 Drawing Sheets

(52) U.S. Cl.
CPC .......... *Y10T 74/2162* (2015.01); *Y10T 225/10* (2015.04); *Y10T 225/12* (2015.04); *Y10T 225/371* (2015.04)

(58) Field of Classification Search
USPC .............. 225/2, 96, 96.5, 100, 101, 103, 97; 384/294
See application file for complete search history.

(56) References Cited

U.S. PATENT DOCUMENTS

| | | | |
|---|---|---|---|
| 4,916,951 A * | 4/1990 | Messner | B21D 37/145 72/448 |
| 5,105,538 A * | 4/1992 | Hoag et al. | 29/888.09 |
| 5,115,564 A * | 5/1992 | Miessen et al. | 29/888.09 |
| 5,320,265 A * | 6/1994 | Becker | 225/104 |
| 5,911,349 A * | 6/1999 | Wiesemann | B23D 31/003 225/103 |
| 6,168,418 B1 * | 1/2001 | Levinson | F23N 1/007 137/514 |
| 6,644,529 B1 * | 11/2003 | Guirgis et al. | 225/2 |
| 6,961,997 B2 * | 11/2005 | Kubota et al. | 29/888.09 |
| 7,155,791 B1 * | 1/2007 | Foster | 29/239 |
| 2002/0023939 A1 * | 2/2002 | Hase | 225/2 |
| 2003/0201296 A1 * | 10/2003 | Magliaro et al. | 225/1 |
| 2004/0129751 A1 * | 7/2004 | Piana et al. | 225/101 |
| 2009/0000111 A1 * | 1/2009 | Schneider | B65G 49/0459 29/791 |
| 2010/0258604 A1 | 10/2010 | Muellner et al. | |

FOREIGN PATENT DOCUMENTS

| | | | |
|---|---|---|---|
| DE | 10013980 A1 * | 9/2001 | ............... B26F 3/00 |
| DE | 101 37 975 A1 | 2/2003 | |
| DE | 10 2004 053 172 A1 | 5/2006 | |
| DE | 10 2007 029 663 B3 | 11/2008 | |
| DE | 102008014434 A1 * | 9/2009 | ............. B23D 31/00 |

OTHER PUBLICATIONS

German Search Report dated May 6, 2014, with partial English translation (Twelve (12) pages).
Jan. 15, 2016 correspondence from third-party (two (2) pages).

* cited by examiner

METHOD FOR FRACTURE SPLITTING A CONNECTING ROD AND CORRESPONDING DEVICE

This application claims priority under 35 U.S.C. 119 from German Patent Application No. DE 10 2013 008 115.7, filed May 11, 2013, the entire disclosure of which is herein expressly incorporated by reference.

BACKGROUND AND SUMMARY OF THE INVENTION

The invention relates to a method for fracture splitting a connecting rod, wherein a force is exerted on an outer rim of an eye of the connecting rod by means of a separating tool. Furthermore, the invention relates to a corresponding device for fracture splitting a connecting rod. Finally the invention relates to a connecting rod with at least one eye and an outer rim surrounding the eye.

In an internal combustion engine the linear movements of a piston of a cylinder are transmitted into the circular movement of the crankshaft by means of the connecting rod, for which another name is conrod. For this purpose the connecting rod has a shank; a large eye, also called the big end; and a small eye, which may also be called the small end. In the state of the art the large eye is usually split, in order to fulfill the objective of fastening the crankshaft. The splitting is performed by machining down or by generating a fracture, which is also referred to as "cracking."

When fracture splitting the large eye of the connecting rod by mechanical means, a drift punch is inserted, for example, in accordance with the German patent DE 10 2007 029 663 B3. In this case the rotational motion of a drive axis is slowly transmitted into the forward motion of the punch.

The drawback with the state of the art is that despite all of the optimization with respect to the uniformity and the speed of the splitting process, the process is slow. Therefore, first an elastic deformation and then a plastic deformation of the fracture zone occur until finally this fracture zone actually breaks apart. Although the net result of this method is that the fracture surfaces fit relatively well together, these fracture surfaces have components that are plastically deformed in the micro range and, hence, are deformed again or even break off in the course of the subsequent reassembly.

Therefore, in the state of the art it is necessary to some extent to disconnect again the connecting rod after the broken pieces have been initially bolted together, in order to remove the micro particles from the surfaces in various ways (for example, by shaking or blowing). Then the broken pieces are bolted together again.

In addition, the methods according to the state of the art require special materials (e.g. C70 steel, thus a steel that contains 0.70% carbon) for the connecting rod, where the special materials lend themselves especially well to fracture splitting. Therefore, it is not possible to split by fracturing tougher materials or more specifically higher strength materials (e.g. 42CrMo4 steel).

The property of a material that is able to undergo plastic deformation under a mechanical load is referred to as ductility. The more ductile a material is, the higher the plastic deformability is until a crack occurs. Hence, ductile materials (thus, materials having a ductility above a certain limit value) are not used to manufacture connecting rods that are to be subjected to a fracture splitting process using the method according to the state of the art.

Therefore, the object of the present invention consists of proposing a method for fracture splitting and a corresponding device for fracture splitting. In this context both the method and the device for fracture splitting overcome the disadvantages of the state of the art and, in particular, allow the use of other materials than those used in the state of the art for connecting rods that are to be split.

According to one teaching of the invention, the engineering object, which is described and derived in the preceding introductory part, is achieved by means of a method for fracture splitting a connecting rod. In this case the fracture splitting method is characterized primarily and in essence by the fact that a separating tool, consisting of at least two separating members, is inserted into the eye, and that an electromagnetic force is generated, by means of which the two separating members are moved away from each other inside the eye.

According to the invention, the fracture splitting process takes place, in that two separating members of a separating tool move away from each other owing to the impact of an electromagnetic force. Due to the geometry of the two separating members and the adaptation to the geometry of the eye to be split, a mechanical force acts on the outer rim of the eye, as a result of which a fracture occurs.

The use of an electromagnetic force makes it possible to significantly speed up the actual fracture splitting process, as compared to the state of the art with its conventional purely mechanical or even hydraulic systems; or more specifically the use of an electromagnetic force makes it possible to shorten the time it takes for the mechanical force, which causes the fracture, to act. If, however, the mechanical force acts on the outer rim of the eye for just a short period of time, then a plastic deformation of the outer rim with all of its associated drawbacks is avoided. The electromagnetic force is obtained in one embodiment, in particular, by means of mutually repelling magnetic fields that are generated at least partially by means of at least one electric current.

The net result is, according to the invention, a high speed splitting method that lends itself to splitting workpieces, such as connecting rods and the like, by fracturing. One advantage is primarily the higher separating speed that avoids plastic deformations.

One embodiment provides that the electromagnetic force is generated in such a way that a mechanical force, which acts on the eye as a result of said electromagnetic force, acts on the eye for a duration of time of less than or equal to 100 microseconds. In one preferred embodiment the force acts for a duration of time between 30 and 50 microseconds. As an alternative, the force acts for a duration of time between 35 and 50 microseconds and, in particular, only for a duration of time that is less than or approximately equal to 40 microseconds. Therefore, the acting mechanical force resembles, in particular, a pulse, where the transition from the state, in which no mechanical force is acting, to the state, in which the maximum mechanical force is acting, occurs abruptly and suddenly.

In order to achieve such a mechanical pulse that corresponds to a short strong jolt, a pulse-like electromagnetic force is generated in accordance with one embodiment. If the electromagnetic force acts in a manner similar to a pulse between the separating members, then these separating members also generate a pulse-like mechanical force on the outer rim of the eye owing to the movement of said separating members away from each other. This feature makes it possible to avoid the gradual increase in force and the associated plastic deformation of the outer rim of the connecting rod in the region of the breaking point, which is the case in the state of the art.

In order to improve the fracture splitting process, during which the electromagnetic force that is generated is converted into the mechanical force, one embodiment provides that the two separating members are inserted into the eye in such a way that at least one separating member rests at least partially against an inner face of the outer rim of the eye. In one embodiment both separating members rest against the inner face of the outer rim. If said at least two separating members move away from each other due to the electromagnetic force, then they push mechanically against the outer rim and, in so doing, cause said outer rim to break.

In order to specify in a defined manner the point, at which the rim of the eye shall break, at least one score line is generated on the inner face of the outer rim of the eye. This can be done by means of a laser or by means of a corresponding mechanical scoring tool. The score line is generated in particular, before the separating tool is inserted into the eye in the form of the two separating members. In one embodiment two score lines are generated on the inner face of the outer rim of the eye. The two score lines are generated in such a manner and the two separating members are inserted into the eye in such a way that the two separating members are opposite each other along an imaginary connecting line between the two score lines. The arrangement of the two score lines and the two separating members has the effect that each of the two separating members acts mechanically against one part of the outer rim between the score lines, so that even the outer rim breaks apart at the score lines.

The following embodiment deals in greater detail with the generation of the electromagnetic force. This embodiment comprises that at least one current signal is applied to at least one coil member, in order to generate the electromagnetic force. Preferably at least one current signal is applied to at least two coil members. The coil members are preferably constructed and arranged in such a manner and at least one current signal or two current signals is and/or are applied to the coil members in such a way that mutually repelling magnetic fields are obtained. For example, the coil members are penetrated by an electric current in the opposite direction. In one embodiment the current signal is obtained by discharging a capacitor or more specifically an array of capacitors that are connected to each other. In one embodiment the two coil members are arranged at least partially between the two separating members. In one embodiment the same current signal is applied to each of the two coil members, so that the result of the configuration of the two coil members is that the fluxes of the magnetic fields are in opposite directions.

Hence, in one embodiment the electromagnetic force is generated by means of two pulse-shaped magnetic fields. The German published patent application [Offenlegungsschrift] DE 10 2004 053 172 A1 discloses, for example, a similar method for deforming, for example, tubes.

The electromagnetic pulse technology (EMPT) that is described in said German published patent application makes use of the fact that the so-called Lorentz force acts on current carrying conductors in a magnetic field. Since, furthermore, current carrying conductors themselves generate magnetic fields, two parallel, current carrying conductors will attract each other, when the direction of the current flux is the same in both conductors. For the deformation of tubes, said tubes are inserted into a coil, to which an alternating current is applied. Based on Lenz's law, the coil in the tube, which is made of an electrically conductive material, generates an opposing current flux; and the tube experiences a force that is used for forming. Due to the mass moment of inertia, the forming takes place in such a way that it is offset in time in relation to the current flux. In one embodiment of the fracture splitting method according to the invention, a pulse generator is also used to generate the currents that are necessary for the magnetic field(s).

The engineering object is achieved in accordance with an additional teaching of the invention by means of a device for fracture splitting a connecting rod.

This device is characterized first of all and in essence by the fact that a separating tool, consisting of at least two separating members, is provided. In this context the two separating members are designed and arranged in such a way that they can be moved relative to each other. Furthermore, at least two coil members are provided. Collectively the two separating members and the two coil members are designed, adapted to each other and arranged in relation to each other in such a way that the magnetic fields that interact with each other can be generated by means of the coil members and that the forces that are connected with the interaction of the magnetic fields give rise to a relative movement between the two separating members.

In one embodiment the magnetic field is generated by applying a current to a pulse generator within a very short time. With this arrangement it is possible to generate magnetic fields in a very short time; and their forces, which, for example, repel each other, act on the separating members and, in so doing, also on the connecting rod for a correspondingly short period of time.

In one embodiment the coil members are arranged at least partially in the region of the eye of the connecting rod between the two separating members. In one variant the two coil members and the two separating members are designed and arranged in relation to each other in such a way that the distance between the two coil members is so large, as a function of the magnetic field that is to be generated or the magnetic fields that are to be generated in each instance, that the forces, which act due to the existence of the magnetic fields between the two coil members, are transmitted to the separating members in such a way that a mechanical force is generated; and this mechanical force causes the eye of the connecting rod to split by fracturing. Preferably the distance between the two coil members is as small as possible.

In one embodiment at least one coil member is constructed in one piece with a separating member.

The device is used, above all, to implement the above described method according to at least one embodiment.

Therefore, the above described embodiments of the method according to the invention are implemented preferably by means of the corresponding designs of the inventive device for fracture splitting a connecting rod. Inversely the explanations with respect to the device also apply to the corresponding embodiments of the method.

In one embodiment of the device a fixing device is provided for the connecting rod, which is clamped with said fixing device in such a way that the connecting rod is partially fixed and partially movable. For this purpose one variant provides retaining elements that securely hold one part of the connecting rod and that receive or rather catch another part of the connecting rod, where said other part of the connecting rod involves preferably the smaller broken fragment of the eye after the fracture splitting process.

The device according to the invention is used to generate a separating movement that takes the separating members of the separating tool away from each other, in that an electromagnetic pulse method is employed. In one embodiment a very strong electromagnetic field is generated by means of very fast discharging capacitors and by means of suitably arranged coil members; and this very strong electromagnetic field gives rise to the separating members suddenly moving apart as the expansion tools.

According to an additional teaching, the invention relates to a connecting rod with at least one eye and an outer rim surrounding the eye. At the same time at least the outer rim around the eye is fracture split with the method according to one of the above described embodiments and/or through the use of the aforementioned device for implementing the method according to the invention.

Since the fracture splitting process takes place by means of a pulse with a very short duration of time of less than or equal to 100 microseconds (preferably between 30 and 50 microseconds, as an alternative between 35 and 50 microseconds and preferably a duration of time of less than or equal to 40 microseconds), it is possible to access a larger choice of steel grades available for designing the connecting rod.

Therefore, one embodiment provides that at least the outer rim around the eye of the connecting rod is made at least partially of a ductile material. In this context ductile means that the ductility exceeds a limit value that would render the application of the fracture splitting method in accordance with the invention infeasible. The material that is used for the connecting rod is, for example, 42CrMo4 steel or, in general, a steel that has the corresponding ductility or even a higher value.

The connecting rods that are split by fracturing according to the invention are made of higher strength and tougher materials than those suitable for the fracture splitting process in the state of the art. In detail there are a plethora of possibilities for designing and further developing the inventive method, the inventive device as well as the fracture split connecting rod.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
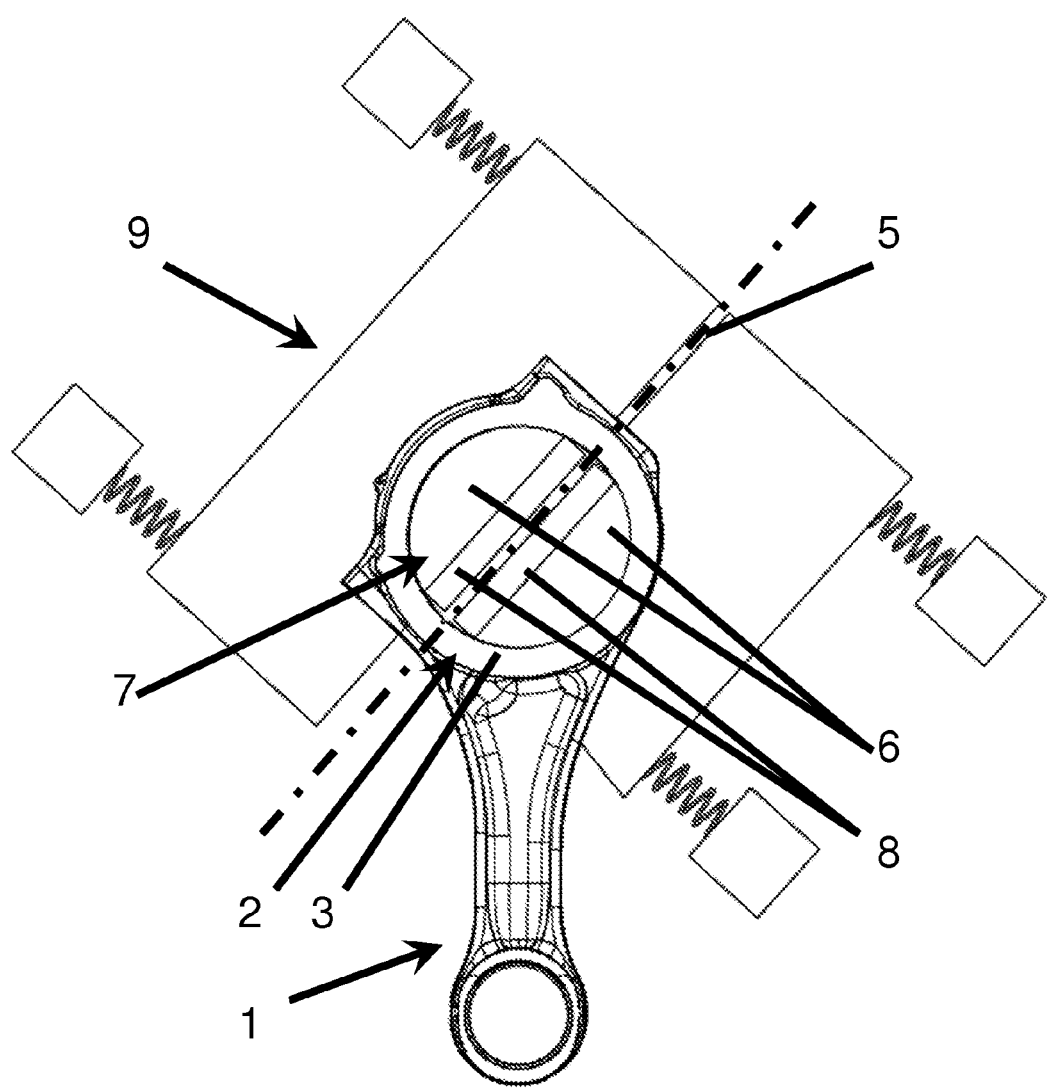
FIG. 1 is a schematic representation of one step of the inventive method with a part of the device according to an embodiment of the invention.
Figure 2B:
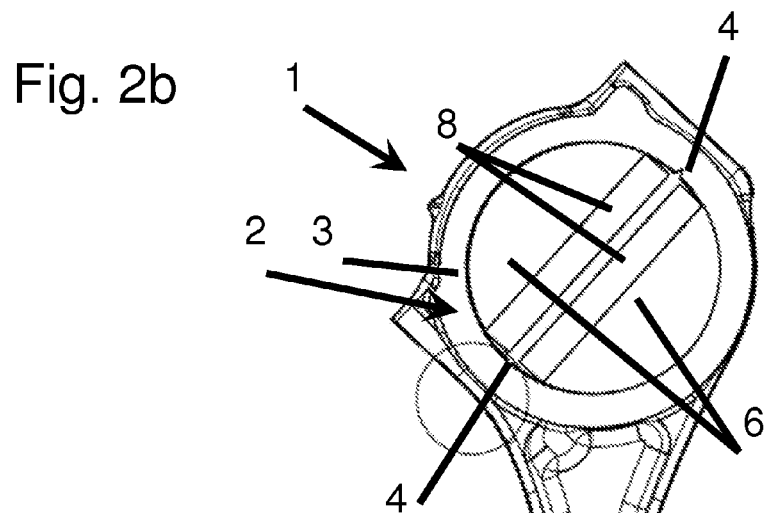
FIGS. 2a and 2b are details from FIG. 1 with an enlarged cut-out.
Figure 2A:
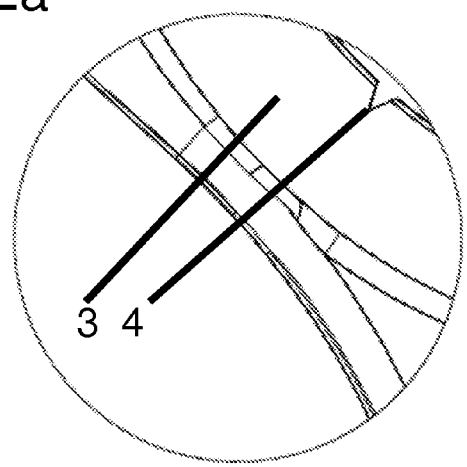

FIG. 1 shows the method according to an embodiment of the invention in an early step, in which the connecting rod 1 has not been split yet. FIG. 2b shows the connecting rod 1 and the components inside the large eye 2. FIG. 2a shows the region, around which a circle has been drawn in FIG. 2b, on an enlarged scale. For the following description reference is made to the two figures.

Two score lines 4, which are diametrically opposite each other, have been formed on the inner face of the outer rim 3 of the eye 2. One of the score lines 4 is shown on an enlarged scale in FIG. 2a). In this case the score lines 4 are generated, before the connecting rod 1 is fixed in a retaining arrangement 9, which is shown to some extent in the embodiment.

The two separating members 6, which together form the separating tool 7, are also situated opposite each other along the imaginary connecting line 5 between the two score lines 4. Each of the two separating members 6, which are configured at least approximately as halves of a circle, rests with its rounded off section against the inner face of the outer rim 3.

Between the two separating members 6 there are two coil members 8 in the form of current conductors, which extend more or less parallel to each other, in particular inside the eye 2 in the embodiment that is shown; and each of these two coil members rests against a separating member 6. The two coil members 8 generate magnetic fields, as a result of a current signal being applied to them.

In one embodiment the two coil members 8 are connected to each other by an arc outside the eye 2, so that an electric current signal flows through a coil member 8 in one direction, is deflected by 180° outside the eye 2 and then flows through the other coil member 8 in the opposite direction.

The coil members 8 are designed in such a way that they are at least partially electrically conductive and/or that, as a result of applying an electric current signal to said coil members, a magnetic field is obtained, in particular, around said coil members. In the embodiment that is shown the separating members 6 are designed in such a way that the magnetic fields have no impact or only a negligible impact on said separating members. In this case the separating members 6 are made at least partially of a composite material or a ceramic.

When a current signal is applied to the coil members 8 (as an alternative two current signals are used that are generated in a correspondingly coordinated manner), the coil members 8 generate magnetic fields. Since in the embodiment that is shown the direction of the current flux in both coil members 8 runs in the opposite direction, the magnetic fields repel each other. The force or more specifically the movements that are association with this mutual repulsion are transmitted over the two separating members 6 to the outer rim 3 of the eye 2.

If the electric current is generated, in particular, only as a short pulse with equally negligible rise time, then the separating members 6 also move away from each other within a very short moment. As a result, a correspondingly high mechanical force, which gives rise to a fracture, acts very briefly on the outer rim 3 without having previously generated a plastic deformation in the outer rim 3. Therefore, the fracture in the region of the score lines 4 occurs so fast that the phase of deformation of the material of the connecting rod 1 is skipped. At the same time the period of time that it takes for the mechanical force to reach its full value is less than 40 microseconds in one embodiment.

The coil members 8 are situated opposite each other, in particular, over a wide area inside the eye 2. Preferably the coil members 8 are designed in such a way that the magnetic fields that are generated in each case maximally repel each other.

The retaining arrangement 9 of FIG. 1 is used for the purpose of absorbing the movements of the separating members 7 after the fracture splitting process and for the purpose of cushioning by springs or more specifically for the purpose of defining the travel of the separating members 7 and, in so doing, also the coil members 8. In this context preferably a receiving device, which is not illustrated herein, is provided for the smaller fragment of the connecting rod 1. In addition, the connecting rod 1 is held during the fracture splitting process by a support element (not illustrated herein), which runs through the small eye. In the variant that is shown both elements of the retaining arrangement 9 are spring mounted. In one embodiment only one element is connected with springs.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for fracture splitting a connecting rod, comprising the acts of:
    providing a separating tool,
    inserting within an outer rim of an eye of the connecting rod the separating tool including at least two separating members and at least two coil members between the two separating members, at least portions of the at least two coil members being located between the at least two separating members within the eye and being capable of generating a magnetic field around the at least two coil members when a current signal is applied to at least one of the at least two coil members; and
    generating an electromagnetic force by applying at least one current signal to at least one of the at least two coil members to generate the magnetic field, the magnetic field comprising mutually-repelling magnetic fields within the eye with a field strength sufficient to cause the at least two separating members to repel one another and generate a mechanical separating force acting on the outer rim of the eye of the connecting rod,
    wherein the electromagnetic force is generated in a manner causing the mechanical force to act on the outer rim for a duration of less than or equal to 100 microseconds.

2. The method as claimed in claim 1, further comprising the act of:
    generating at least one score line on an inner face of the outer rim of the eye prior to the insertion of the separating tool into the eye.

3. A device for fracture splitting a connecting rod, comprising:
    a separating tool including at least two separating members displaceable relative to one another; and
    at least two coil members being capable of generating a magnetic field around the at least two coil members, the magnetic field comprising mutually-repelling magnetic fields, when a current signal is applied to at least one of the at least two coil members,
    wherein
        the at least two separating members and the at least two coil members are configured to be inserted into an eye of the connecting rod and to generate the mutually-repelling magnetic fields within the eye, and
        the two separating members and the at least two coil members are arranged such that when in an operative position within the eye of the connecting rod at least portions of the at least two coil members are located between the at least two separating members within the eye and a relative movement of the at least two coil members relative to one another in response to the magnetic field within the eye generates a relative movement between the at least two separating members in a manner that causes the at least two separating members to apply a mechanical force to an outer rim of the connecting rod eye for a duration of less than or equal to 100 microseconds.

4. A connecting rod, comprising:
    at least one eye; and
    an outer rim around the eye,
    wherein
        the outer rim around the eye includes first and second separated portions formed by application of the method as claimed in claim 1.

5. A connecting rod as claimed in claim 4, wherein
    at least the outer rim around the eye is at least partially formed from a ductile material.

6. A connecting rod, comprising:
    at least one eye; and
    an outer rim around the eye,
    wherein
        the outer rim around the eye includes first and second separated portions formed by application of the device as claimed in claim 3.

7. A connecting rod as claimed in claim 6, wherein
    at least the outer rim around the eye is at least partially formed from a ductile material.

* * * * *